(12) United States Patent
Cherubini et al.

(10) Patent No.: US 9,330,700 B2
(45) Date of Patent: May 3, 2016

(54) MAGNETIC TAPE STORAGE MEDIUM

(71) Applicant: International Business Machines Corporation, Armonk, NY (US)

(72) Inventors: Giovanni Cherubini, Rueschlikon (CH); Simeon Furrer, Rueschlikon (CH); Jens Jelitto, Rueschlikon (CH); Mark A. Lantz, Rueschlikon (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/694,438

(22) Filed: Apr. 23, 2015

(65) Prior Publication Data
US 2015/0318007 A1    Nov. 5, 2015

(30) Foreign Application Priority Data

May 2, 2014   (GB) .................................. 1407769.7

(51) Int. Cl.
*G11B 5/584* (2006.01)
*G11B 20/12* (2006.01)

(52) U.S. Cl.
CPC ............ *G11B 5/584* (2013.01); *G11B 20/1201* (2013.01); *G11B 20/1252* (2013.01); *G11B 2020/1281* (2013.01)

(58) Field of Classification Search
CPC ........... G11B 27/3027; G11B 2220/90; G11B 5/012; G11B 5/59655; G11B 5/59688; G11B 5/584; G11B 5/5504
USPC ................ 360/48, 49, 77.08, 53, 77.12, 78.02
See application file for complete search history.

(56) References Cited

U.S. PATENT DOCUMENTS

| | | | |
|---|---|---|---|
| 6,961,203 B1 * | 11/2005 | Baker ................... | B82Y 10/00 360/75 |
| 7,440,224 B2 * | 10/2008 | Ehrlich .............. | G11B 5/59688 360/75 |

(Continued)

FOREIGN PATENT DOCUMENTS

| | | |
|---|---|---|
| GB | 2508388 A | 6/2014 |
| WO | 0215174 A1 | 2/2002 |

OTHER PUBLICATIONS

Giovanni Cherubini, et al.,"Magnetic Tape Storage Medium," U.S. Appl. No. 14/745,544, filed Jun. 22, 2015.
List of IBM Patents or Patent Applications Treated as Related; CH920140020US1, Date File: Apr. 23, 2015, pp. 1-2.

(Continued)

*Primary Examiner* — Nabil Hindi
(74) *Attorney, Agent, or Firm* — Cantor Colburn LLP; Keivan Razavi

(57) ABSTRACT

A magnetic tape storage medium includes at least one servo band with at least two sub-bands along a longitudinal extension of the medium. Servo bursts are written to the sub-bands to determine positional information of the medium. A first of the sub-bands includes a first burst with at least one servo stripe inclined at a first non-zero angle with respect to a direction orthogonal to the longitudinal extension of the medium followed by a second burst comprising at least one servo stripe inclined at a second non-zero angle with respect to the direction orthogonal to the longitudinal extension of the medium, which second angle is different from the first angle. A second of the sub-bands includes a first burst having at least one servo stripe followed by a second burst having at least one servo stripe, the first and the second bursts parallel to each other.

19 Claims, 4 Drawing Sheets

(56) References Cited

U.S. PATENT DOCUMENTS

2003/0123185 A1    7/2003    Denison et al.
2006/0126207 A1    6/2006    Johnson et al.
2009/0109563 A1    4/2009    Handa et al.

OTHER PUBLICATIONS

IPO UK Search Report; Application No: GB1407769.7; Patents Act 1977: Search Report under Section 17(5); Date Mailed: Oct. 24, 2014, pp. 1-4.

* cited by examiner

MAGNETIC TAPE STORAGE MEDIUM

FOREIGN PRIORITY

This application claims priority to Great Britain Patent Application No. 1407769.7, filed May 2, 2014, and all the benefits accruing therefrom under 35 U.S.C. §119, the contents of which in its entirety are herein incorporated by reference.

BACKGROUND

The present invention relates to a magnetic tape storage medium for storing data, a write head module, a method for writing a servo pattern to a magnetic tape storage medium, a head module, and a method for reading a servo pattern from a magnetic tape storage medium.

A magnetic tape storage medium typically includes servo information prerecorded in one or more of dedicated servo bands that extend next to data tracks for storing data in a longitudinal direction along the tape storage medium. A servo band typically is read by a dedicated servo reader of a head module of a tape drive, into which a cartridge containing the tape storage medium is inserted to. The read servo information allows for determining a lateral deviation of the tape storage medium from a lateral reference position, which lateral reference position is desired for correctly reading data from and writing data to the tape storage medium by dedicated read and write elements of the head module. A position error signal supplied by the servo reader may be translated into a control signal for an actuator for controlling the lateral position of the head module with respect to the tape storage medium.

Timing-based servo (TBS) is a technology developed specifically for linear tape drives in the late '90s. In TBS systems, recorded servo patterns include transitions with at least two different azimuthal slopes. The head module lateral position is derived from the relative timing of pulses generated by a servo reader reading the servo pattern. TBS was adopted by the linear tape open (LTO) consortium, and a complete format for LTO tape drives of the first generation was standardized by the European Computer Manufacturers Association (ECMA) in 2001 as ECMA-319. The servo patterns in LTO are written on five dedicated servo bands that straddle four data bands.

SUMMARY

In one embodiment, magnetic tape storage medium includes at least one servo band with at least two sub-bands along a longitudinal extension of the tape storage medium; servo bursts written to the at least two sub-bands for supporting to determine positional information of the tape storage medium; wherein, in a first of the at least two sub-bands, a first burst comprises at least one servo stripe inclined at a first non-zero angle with respect to a direction orthogonal to the longitudinal extension of the tape storage medium, followed by a second burst comprising at least one servo stripe inclined at a second non-zero angle with respect to the direction orthogonal to the longitudinal extension of the tape storage medium, which second angle is different from the first angle; wherein, in a second of the at least two sub-bands, a first burst comprises at least one servo stripe followed by a second burst comprising at least one servo stripe, which stripes of the first and the second burst are parallel to each other.

DETAILED DESCRIPTION

Figure 1:
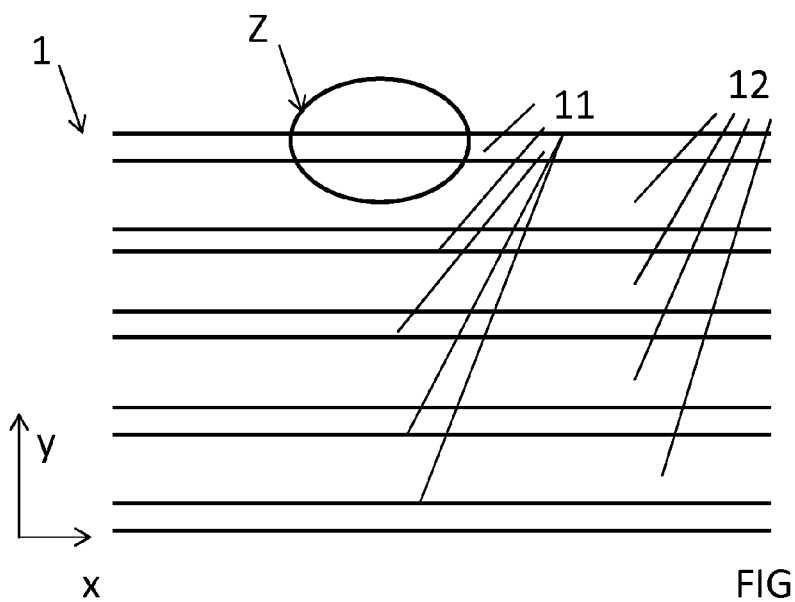
FIG. 1 is a schematic top view on a section of a tape storage medium according to an embodiment of the present invention.

According to one aspect of the invention, a magnetic tape storage medium is provided comprising at least one servo band with at least two sub-bands along a longitudinal extension of the tape storage medium, and servo bursts written to the at least two sub-bands for supporting to determine positional information. A first of the at least two sub-bands includes a first burst comprising at least one servo stripe inclined at a first non-zero angle with respect to a direction orthogonal to the longitudinal extension of the tape storage medium followed by a second burst comprising at least one servo stripe inclined at a second non-zero angle with respect to the direction orthogonal to the longitudinal extension of the tape storage medium which second angle is different from the first angle. A second of the at least two sub-bands includes a first burst comprising at least one servo stripe followed by a second burst comprising at least one servo stripe, which stripes of the first and the second burst are parallel to each other.

In embodiments, the magnetic tape storage medium may include one or more of the following features: the stripes of the first and the second burst of the second sub-band are aligned orthogonal to the longitudinal extension of the tape storage medium; the stripes of the first and the second burst of the second sub-band are aligned non-orthogonal to the longitudinal extension of the tape storage medium; the number of stripes in the first burst of the first sub-band is equal to the number of stripes in the second burst of the first sub-band; the number of stripes in the first burst of the second sub-band is equal to the number of stripes in the second burst of the second sub-band; the number of stripes in the first burst of the first sub-band is equal to the number of stripes in the first burst of the second sub-band; the number of stripes in the second burst of the first sub-band is equal to the number of stripes in the second burst of the second sub-band; the number of stripes in the first burst of the first sub-band is different from the number of stripes in the first burst of the second sub-band; the number of stripes in the second burst of the first sub-band is different from the number of stripes in the second burst of the second sub-band; the first stripe of the first burst in the first sub-band crosses a centerline of the first sub-band at the same longitudinal position of the tape storage medium as the first stripe of the first burst in the second sub-band crosses a centerline of the second sub-band; the first stripe of the second burst in the first sub-band crosses the centerline of the first sub-band at the same longitudinal position as the first stripe of the second burst in the second sub-band crosses the centerline of the second sub-band; each stripe of the first burst in the first sub-band crosses the centerline of the first sub-band at the same longitudinal position as the corresponding stripe of the first burst in the second sub-band crosses the centerline of the second sub-band; each stripe of the second burst in the first sub-band crosses the centerline of the first sub-band at the same longitudinal position as the corresponding stripe of the second burst in the second sub-band crosses the centerline of the second sub-band; the first burst in the first sub-band and the first burst in the second sub-band are mirrored into the second burst of the first sub-band and the second burst of the second sub-band at a common centerline orthogonal to the longitudinal extension of the tape storage medium between the first and second bursts of the first and second sub-band.

A servo frame of the first sub-band includes the first burst and the second burst and a third burst following the second burst and a fourth burst following the third burst; a servo frame of the second sub-band includes the first burst and the second burst and a third burst following the second burst and a fourth burst following the third burst; the third burst of the first sub-band includes at least one servo stripe inclined at a first non-zero angle with respect to a direction orthogonal to the longitudinal extension of the tape storage medium followed by at least one servo stripe of the fourth burst of the first sub-band inclined at a second non-zero angle with respect to the direction orthogonal to the longitudinal extension of the tape storage medium, which second angle is different from the first angle; the third burst of the second sub-band includes at least one servo stripe followed by at least one servo stripe of the fourth burst of the second sub-band, which stripes of the third and the fourth burst of the second sub-band are parallel to each other; the number of stripes in the third burst of each of the first and second sub-band is different to the number of stripes of the first burst of each of the first and second sub-band; the number of stripes in the fourth burst of each of the first and second sub-band is different to the number of stripes in the second burst of each of the first and second sub-band; a third of the at least two sub-bands includes a first burst comprising at least one servo stripe followed by a second burst comprising at least one servo stripe which stripes of the first and the second burst of the third sub-band are parallel to each other; the first sub-band is arranged between the third sub-band and the second sub-band; additional information is encoded in the servo bursts of one or more of the first and the second sub-band; the additional information includes one or more of a servo band identifier and a longitudinal position of the tape storage medium.

According to another aspect of the present invention, a write head module is provided for writing a servo pattern to a magnetic tape storage medium, and in particular for writing the first and second servo bursts of the first and second sub-band of a tape storage medium according to any one of the embodiments thereof. The write head module includes at least one coil for generating a magnetic flux when applying an electric current thereto. The write head module further includes a pole piece structure for guiding the generated magnetic flux. The pole piece structure includes a first section for writing a servo pattern to a first sub-band of a servo band of the tape storage medium. The first section includes a first gap in form of a stripe inclined at a first non-zero angle with respect to a direction orthogonal to a longitudinal extension of the tape storage medium when being written, and a second gap in form of a stripe inclined at a second non-zero angle with respect to a direction orthogonal to a longitudinal extension of the tape storage medium when being written, which second angle is different from the first angle. The pole piece structure further includes a second section next to the first section for writing a servo pattern to a second sub-band of the servo band of the tape storage medium. The second section includes a first gap in form of a stripe, and a second gap in form of a stripe, which first and second gap are parallel to each other.

In embodiments, the write head module may include one or more of the following features: a single coil for generating the magnetic flux across the first and the second gap of the first section and the first and the second gap of the second section when applying an electric current to the single coil; a first coil for generating the magnetic flux across the first and the second gap of the first section when applying an electric current thereto, and a second coil for generating the magnetic flux across the first and the second gap of the second section when applying an electric current thereto; the electric current to the first coil and the electric current to the second coil are independently applicable.

According to another aspect of the present invention, a method is provided for writing a servo pattern to a magnetic tape storage medium by means of a write head module comprising a single coil. The magnetic tape storage medium is moved with its servo band across the first and second gaps of the write head module in a direction along the longitudinal extension of the magnetic tape storage medium. A current pulse is applied to the coil. The magnetic tape storage medium is continued to be moved, and another current pulse is applied to the coil.

According to another aspect of the present invention, a method is provided for writing a servo pattern to a magnetic tape storage medium by means of a write head module comprising two coils. The magnetic tape storage medium is moved with its servo band across the first and second gaps of the write head module in a direction along the longitudinal extension of the magnetic tape storage medium. A current pulse is applied to the first coil. The magnetic tape storage medium is continued to be moved, and a current pulse is applied to the second coil. In a preferred embodiment, a current pulse is additionally applied to the second coil simultaneous to applying the current pulse to the first coil.

According to another aspect of the present invention, a read head module is provided that is configured for reading from a servo band of a magnetic tape storage medium according to any one of the embodiments thereof. The head module includes a first servo reader arranged for reading from the first sub-band and a second servo reader arranged for reading from the second sub-band. In particular, the first and the second servo reader are arranged in the head module next to each other.

According to another aspect of the present invention, a method is provided for reading from a magnetic tape storage medium according to any one of the embodiments thereof. The first and the second burst of the first sub-band are read by a first servo reader. A first time interval is determined between appearances of two corresponding stripes of the first and the second burst in the read-back signal of the first servo reader. The first and the second servo burst of the second sub-band are read by a second servo reader. A second time interval is determined between appearances of two corresponding stripes of the first and the second burst in the read-back signal of the second servo reader. A lateral position of a head module containing the first and the second servo reader with respect to the tape storage medium is determined dependent on the first and the second time interval.

In a preferred embodiment of the read method, an average first time interval is determined for the appearances of any two corresponding stripes of the first and second burst in the read-back signal of the first servo reader. An average second time interval is determined for the appearances of any two corresponding stripes of the first and second burst in the read-back signal of the second servo reader. The lateral position of the head module is determined dependent on a ratio of the average first time interval and the average second time interval.

According to another aspect of the present invention, a computer program medium is provided containing computer program code means for implementing a method according to any one of the previous embodiments when executed on a processor unit.

It is understood that method steps may be executed in a different order than listed in a method claim. Such different order shall also be included in the scope of such claim as is the order of steps as presently listed.

Embodiments described in relation to the aspect of an apparatus shall also be considered as embodiments disclosed in connection with any of the other categories such as the method, the computer program product, etc.

As an introduction to the following description, it is first pointed at a general aspect of the invention, concerning a magnetic tape storage medium for storing data.

Such magnetic tape storage medium (also abbreviated as tape) may be arranged in a cartridge which cartridge may be inserted into a tape drive for reading data from the magnetic tape storage medium and writing data to the magnetic tape storage medium. The magnetic tape storage medium has a longitudinal extension and a width orthogonal to its longitudinal extension. The magnetic tape is wound on one or more reels which are driven by the tape drive in order to make the magnetic tape storage medium pass by a head module for reading and/or writing data from and/or to the magnetic tape storage medium. The magnetic tape storage medium typically is preformatted with servo information. This servo information in form of servo patterns enables the head module to pick up information as to a lateral position of the head module with respect to the magnetic tape storage medium, which lateral position is a position orthogonal to the longitudinal extension of the magnetic tape storage medium. Such position information may be converted into a control signal for the head module to laterally readjust the head module in case a deviation from a lateral reference position is detected which lateral reference position is desired to be maintained by the head module for correctly reading data from and writing data to the tape by dedicated read and write elements of the head module. The deviation signal, also denoted as position error signal (PES), is typically supplied by a servo channel processing the signal from a dedicated servo reader of the head module and may be translated into a control signal for an actuator for controlling the lateral position of the head module with respect to the tape. Given that in one embodiment the servo reader and any other read and/or write element of the head module are commonly actuated by the actuator, a rapid correction of the head module deviation may be achieved during reading and/or writing data from and/or to the tape.

The servo information typically is preformatted on dedicated areas of the tape, also denoted as servo bands extending along the longitudinal extension of the tape. The servo information typically is prerecorded in the one or more servo bands by the tape manufacturer. The one or more servo bands extend next to data bands for storing data. Each data band may contain multiple data tracks, wherein each data track is provided for sequentially storing data.

At least one servo band, and preferably all of the servo bands include at least two sub-bands extending next to each other along the longitudinal extension of the tape storage medium. Preferably, the, or each servo band includes two sub-bands, or, in another embodiment, three sub-bands. As a result, within a servo band two different servo patterns may be written to every sub-band. Accordingly, a head module according to an embodiment of the invention includes two servo readers next to each other for reading from one servo-band, i.e., for reading the servo patterns from the two sub-bands of this servo band. For the case of three servo sub-bands, the two servo readers read information from the first and second servo sub bands during tape transport in one direction and from the second and third servo sub-bands during tape transport in the opposite direction.

For each of the sub-bands per servo band it is preferred that the servo information represented by servo patterns is organized in multiple servo frames with each servo frame containing a servo pattern. A servo frame may, for example, be considered as a unit containing servo information according to a specific arrangement. In the present embodiment, a servo frame, and preferably each servo frame of a sub-band may contain multiple bursts. Each burst preferably includes a sub-pattern which in the present embodiment is defined by an orientation of a set of stripes of magnetic transitions. The set may at minimum contain one stripe. In case of multiple stripes per set, the stripes of a common set are preferably arranged in parallel to each other.

A first one of the at least two sub-bands of the respective servo band includes at least two bursts. The one or more stripes in the first burst are inclined at a first angle with respect to a direction orthogonal to the longitudinal extension of the tape storage medium, which angle is also referred to as azimuthal angle. The first burst is followed by a second burst in which second burst the one or more servo stripes are inclined at a second angle with respect to a direction orthogonal to the longitudinal extension of the tape, which second angle is different from the first angle. This means that the stripes of neighboring bursts in the first sub-band are not parallel to each other. In a preferred embodiment, the first angle is $+\alpha$ while the second angle is $\beta=-\alpha$ with respect to the lateral axis. In such arrangement of stripes within consecutive bursts, an interval between pulses generated by the servo reader when scanning the first and the second burst indicates a lateral position of the servo reader, and as such a deviation of the servo reader from its reference position, and as such a deviation of the position of the head module relative to the tape storage medium. For example, in case the lateral reference position is in the middle of the servo band and the head module is offset from such middle position, a distance between a stripe of the first burst to a corresponding stripe of the second burst in a lateral offset scenario is different than a distance when the head module matches the reference position in the middle of the servo band due to the stripes inclined at different angles in the two bursts. A distance of corresponding stripes is reflected in the read-back signal supplied by a servo reader of the head module by a time interval between appearances of the stripes in form of dibits. Hence, a timing based evaluation of the position error signal supplied in form of pulses by the subject servo reader can be performed.

A second one of the at least two sub-bands of the respective servo band preferably includes a first burst comprising at least one servo stripe followed by a second burst comprising at least one servo stripe which stripes of the first and the second burst of the second sub-band are parallel to each other. In contrast to the first sub-band where the stripes of the first and second burst are aligned non-parallel to each other, the stripes of the first and the second burst of the second sub-band are parallel to each other. However, while in a preferred embodiment, the stripes of the first and the second burst of the second sub-band are arranged orthogonal to the longitudinal extension of the tape storage medium, in a different embodiment, the stripes of the first and the second burst of the second sub-band are arranged non-orthogonal to the longitudinal extension of the tape storage medium, e.g., at an angle, and preferably at one of the first and the second angle which define the orientation of stripes in the first and the second bursts in the first sub-band.

In an embodiment of a method for reading from a magnetic tape storage medium with a servo band set-up such as described in any one of the previous embodiments, the first and the second sub-band of the servo band are read by two dedicated servo readers, i.e., the bursts of the first sub-band are read by a first servo reader, and the bursts of the second sub-band are read by a second servo reader. Given that the first and the second servo reader are mechanically coupled, they read their associate sub-band substantially simultaneously. Generally, in any of the read-back signals of the servo readers an appearance of a stripe in the assigned sub-band may take the form of a dibit. A first time interval may be determined between an appearance of two corresponding stripes of the first and second burst in the read-back signal of the first servo reader. Corresponding stripes are regarded as the stripes of different bursts that have the same number in a sequence of stripes of these bursts. The first time interval preferably is a difference between the appearances of the dibits corresponding to the stripes in the read-back signal of the first servo reader. As indicated above, such first time interval may indicate a lateral position of the head module with respect to the tape storage medium, or a deviation of the first servo reader of the head module from a centerline of the first sub-band. However, for defining the position or deviation as a distance measure, the time interval needs to be converted into a distance which is achieved by determining a velocity the tape storage medium is currently operated at. The velocity preferably is derived from the read-back signal of the second servo reader of the head module while reading the second sub-band. Since in the second sub-band, the stripes of the first servo burst and the stripes of the second servo burst are parallel to each other, dibits in the read-back signal of the second servo reader stemming from corresponding stripes in the first and the second burst always show the same second time interval irrespective of the lateral position of the second servo reader. The second time interval solely depends from the velocity of the tape. Hence, the velocity of the tape can be determined by the second time interval and a distance between two corresponding parallel stripes in the first and the second burst of the second sub-band which distance is known. As a result, the lateral position of the head module with respect to the tape storage system can be determined dependent on the first and the second time interval.

Whenever the first and the second burst of the first sub-band contain the same number of multiple stripes, and the first and the second servo burst of the second sub-band contain the same number of multiple stripes—which, however, may be different from the number of stripes in the first and second burst of the first sub-band—a determination of the lateral position may even be more precise when using an average of the first time intervals between corresponding stripes in the first and second bursts of the first sub-band, and when using an average of the second time intervals between corresponding stripes in the first and second bursts of the second sub-band. Hence, the lateral position may be determined dependent on a ratio of the average first time interval and the average second time interval. The average first time interval may be determined by summing up all times at which the stripes of the second burst in the first sub-band appear and subtracting therefrom the sum of all times at which the stripes of the first burst in the first sub-band appear. In an analogous way, the average second time interval may be determined by summing up all times at which the stripes of the second burst in the second sub-band appear and subtracting therefrom the sum of all times at which the stripes of the first burst in the second sub-band appear.

In a conventional servo band without any sub-bands, the servo band may be filled by servo patterns including four bursts wherein five stripes of the first burst are inclined with respect to five stripes of the second burst, and wherein four stripes of the third burst are parallel to the five stripes of the first burst, and four stripes of the fourth burst are parallel to the five stripes of the second burst. With such a servo pattern a lateral position estimate signal (also abbreviated as PES) may be obtained, e.g., at the end of the fourth burst by averaging the four measured time intervals between the arrival times of dibits stemming from corresponding stripes in the third and fourth burst (a corresponding value is also known as "A-count") and by averaging the four measured time intervals between the arrival times of dibits stemming from corresponding stripes in the second and fourth burst—a corresponding value is also known as "B-count". Here, the tape velocity is determined from the "B count" and a known or assumed distance between the corresponding stripes of the second and the fourth burst. A second PES can be obtained by using a different "A-count" obtained from time intervals of dibits stemming from corresponding stripes of the first and the second burst. Hence two PES estimates can be obtained per servo frame.

In the conventional TBS technique described in the above paragraph, pairs of servo stripes with opposite azimuthal angles are written simultaneously by using a write head module (also referred to as a servo write head) with a pair of write gaps per servo band. Writing pairs of stripes simultaneously ensures that a distance between corresponding stripes is fixed and independent from the tape velocity during tape formatting. However, a distance between adjacent pairs of bursts, for example, the distance between the second burst and the third burst has to rely on a constant tape velocity during writing. Any variation in the tape velocity during formatting results in a variation in the distance between the second and the third burst, and consequently also in the distance between the second and the fourth burst and the distance of the first and the third burst, any of which distances may be used for determining the velocity of the tape storage system. As a result, errors in the velocity estimates and consequently the PES may occur. This phenomenon is referred to as written-in velocity noise, i.e., noise in the "B counts".

As described, in conventional systems the tape velocity is measured by detecting a time difference between corresponding stripes of bursts N and N+2, which represents a longer distance between the stripes than a distance between corresponding stripes of bursts N and N+1, which determines the time difference the lateral position measure is derived from. Hence, a variation in tape velocity during reading from the servo band may impact determination of the velocity and consequently the PES, too. This phenomenon results in high frequency noise affecting a track-following system.

Instead, the presently introduced embodiments do not suffer from written-in velocity noise and yet achieve update rates for generating lateral-position estimates comparable to conventional TBS type patterns. The at least two sub-bands are simultaneously written by a write head module containing two pairs of write gaps next to each other for writing the respective servo patterns to the two sub-bands. It is preferred that in the write head module a stripe of the first burst of the first sub-band and a corresponding stripe of the second burst of the first sub-band are written simultaneously such that a distance between these corresponding stripes is fixed, which makes the "A count" be independent from any change in write velocity. The same is also true for the "B count", given that a stripe in the first burst of the second sub-band and a corresponding stripe in the second burst in the second sub-band are also written simultaneously, such that a distance between these corresponding stripes is fixed, which also makes the "B count" be independent from any change in write velocity.

In an embodiment, groups of four stripes are written simultaneously, e.g., the first stripe of the first and the second burst, as are the second, third, fourth and fifth stripes in any of the respective bursts. The distances between pairs of stripes in the first and second burst of the first sub-band, the first and second burst of the second sub-band, a third and fourth burst in the first sub-band if any, and a third and fourth burst in the second sub-band if any are therefore fixed and independent from the tape velocity during servo formatting.

During read operations the servo patterns in both the first and the second sub-band are read simultaneously by using a pair of servo readers. The read-back signal from the first servo reader reading the first sub-band is used to determine the "A counts" while the read-back signal from the second servo reader is used to determine the "B counts". The "A counts" preferably are determined from a relative timing of dibits stemming from reading corresponding stripes in the first and the second burst, and/or a third and fourth burst if any, by the first servo reader. The "B counts" are preferably determined from the relative timing of dibits stemming from reading corresponding stripes in the first and the second burst of the second sub-band, and/or a third and fourth burst if any, by the second servo reader. Position and velocity information are preferably derived from these "A" and "B counts".

As a result, both "A" and "B counts" are free from written-in velocity errors. An update rate of values of the lateral position error estimation is at least not less than in a conventional TBS pattern. The average measurement bandwidth and measurement delay of "A" and "B counts" is substantially the same. And any variations in the AB distance and A'B' distance between pairs of dibits (stripes) due to tension variations during formatting are substantially the same and therefore a noise term arising from this effect is canceled out in the position estimation. Hence, the geometry of the servo pattern in the embodiments of the present invention does not increase the length of a conventional servo pattern, which in turn determines the rate at which position estimates can be obtained and the delay associated with determining the position and velocity estimates. Reducing delay and increasing update rates are both important for improving a closed-loop performance of the track following servo system.

In the above context, it is very preferred that the servo frames of the first and the second sub-band are arranged synchronous to each other. Synchronization in this context is understood as a servo frame of the first sub-band and a servo frame of the second sub-band starting (and ending) at the same longitudinal position of the tape. This ensures that the lateral deviation and the tape velocity can be measured with respect to servo patterns that were written to the servo band at the same velocity. Specifically, it is preferred that a first stripe of the first burst in the first sub-band crosses a centerline of the first sub-band at the same longitudinal position of the tape storage medium as the first stripe of the first burst in the second sub-band crosses a centerline of the second sub-band. The same may be true for the first stripe of the second burst in the first sub-band and the first stripe of the second burst in the second sub-band. And in particular, each stripe of the first burst in the first sub-band crosses the centerline of the first sub-band at the same longitudinal position as the corresponding stripe of the first burst in the second sub-band crosses the centerline of the second sub-band. The same may hold for each stripe of the second burst in the first sub-band and the corresponding stripes of the second burst in the second sub-band.

In the first sub-band the number of stripes in the first burst is equal to the number of stripes in the second burst, such that a first stripe of the first burst inclined at a positive angle has a corresponding first stripe of the second burst at a negative angle, a second stripe of the first burst (if any) inclined at a positive angle has a corresponding second stripe of the second burst at a negative angle, and so on.

In another embodiment, a servo frame of the first sub-band includes four servo bursts wherein the first and the third servo bursts include stripes parallel to each other, and wherein the second and the fourth servo bursts include stripes parallel to each other. However, the stripes of neighboring servo bursts are not parallel to each other. Hence, a servo frame of the first sub-band may in addition to the first and the second burst include a third burst following the second burst and a fourth burst following the third burst. As with the first and the second burst of the first sub-band, the third burst includes at least one servo stripe inclined at a first non-zero angle, and preferably the same angle as the one or more stripes of the first burst with respect to a direction orthogonal to the longitudinal extension of the tape storage medium. The at least one servo stripe of the fourth burst is inclined at a second non-zero angle, and preferably the same angle as the one or more stripes of the second burst with respect to the direction orthogonal to the longitudinal extension of the tape storage medium. It is preferred that the number of stripes of the third burst is different from the number of stripes of the first burst and the number of stripes of the fourth burst is different from the number of stripes of the second burst. However, it is preferred that the number of stripes in the third burst is equal to the number of stripes in the fourth burst, such that a first stripe in the third burst inclined at a positive angle has a corresponding first stripe in the fourth burst at a negative angle, a second stripe in the third burst (if any) inclined at a positive angle has a corresponding second stripe in the fourth burst at a negative angle, and so on.

In an embodiment, a servo frame of the second sub-band includes four servo bursts, i.e., the first burst and the second burst, and a third burst following the second burst and a fourth burst following the third burst. The third burst includes at least one servo stripe followed by at least one servo stripe in the fourth burst, which stripes of the third and the fourth burst of the second sub-band are parallel to each other. It may be preferred that the number of stripes in the third burst of the second sub-band is different to the number of stripes in the first burst of the second sub-band, and the number of stripes of the fourth burst in the second sub-band is different to the number of stripes in the second burst of the second sub-band. However, it may be preferred that the number of stripes in the third and the fourth burst of the second sub-band is the same. Preferably, the stripes in the third and the fourth burst of the second sub-band have the same orientation as the stripes in the first and the second burst of the second sub-band.

In an embodiment, the number of stripes in the first burst of the first sub-band is equal to the number of stripes in the first burst of the second sub-band, and the number of stripes in the second burst of the first sub-band is equal to the number of stripes in the second burst of the second sub-band. A write head module supporting writing such servo patterns preferably writes four stripes of the servo band at the same time, i.e., a stripe of the first burst in the first sub-band, a corresponding stripe of the second burst in the first sub-band, a stripe in the first burst of the second sub-band, and a corresponding stripe in the second burst of the second sub-band. For doing so, it is preferred that a pole piece structure is provided in the write head module containing four gaps for writing the four stripes and one coil for generating a magnetic flux across all the four gaps when applying an electric current to the coil. The gaps are preferably arranged in two by two, in a first and a second section of the write head module next to each other. The gaps are aligned corresponding to the stripes to be written. In a different embodiment, two coils are provided in the write head module. One of the coils is provided for generating a magnetic flux across the two write gaps of the first section of the write head module for writing the stripes of the first and the second burst of the first sub-band. The other coil is provided for generating a magnetic flux across the two write gaps of the second section of the write head module for writing the stripes of the first and the second burst of the second sub-band. In this embodiment, the stripes of the first sub-band can be written independent from the stripes of the first sub-band such that the bursts in the first and the second sub-band may show a different number of stripes per corresponding burst.

In the first variant of the write head module servo patterns can be written to the two sub-bands by moving the magnetic tape storage medium with its servo band across the first and second gaps of the write head module in a direction along the longitudinal extension of the magnetic tape storage medium and applying a current pulse to the coil while the tape moves. The tape then is continued to be moved and after a defined time another current pulse is applied to the same coil, each time for writing four stripes at the same time, two in the first sub-band, and two in the second sub-band. In the second variant a current pulse may be applied to the first coil, then the magnetic tape storage medium may be moved for a defined time, and a current pulse is applied to the second coil. In this variant, the stripes of the first and the second sub-band may be arranged offset from each other. However, in addition to applying the current pulse to the first coil, another current pulse may simultaneously be applied to the second coil such that only every other stripe in the second sub-band is offset from the stripes in the first sub-band.

In another embodiment of the present invention, additional information may be encoded into the servo patterns of one or more of the sub-bands. Specifically, a single symbol of an M-ary alphabet may be encoded per servo frame. Therefore, for encoding a word containing x M-ary symbols, x servo frames may be used. Within a servo frame, the symbol may be encoded redundantly in more than one burst, or may not be encoded redundantly on a burst basis such that only a single burst holds the encoded information. In a preferred embodiment, a servo frame of the first sub-band includes four bursts and a symbol may be encoded only in two consecutive bursts, and preferably in the first two bursts. However, other encoding configurations within a servo frame may be possible. Within a burst, and provided that a burst holds a sub-pattern in form of a set of parallel stripes, only a subset of the set of stripes may be used for encoding a symbol. In one embodiment, a single stripe of the set of stripes may be used for encoding a symbol. In another embodiment, multiple stripes, e.g., two stripes out of the set of stripes of a burst may be encoded with a symbol, and preferably all the stripes may be encoded by the same symbol which is the single symbol encoded in the present servo frame. Encoding a symbol redundantly into multiple stripes and/or into multiple bursts and/or into the servo frames of multiple sub-bands further improves a reliable decoding of such symbol.

Specifically, the additional information may be information as to a presently scanned longitudinal position of the tape. Such longitudinal position information, also denoted as LPOS, may in one embodiment be encoded in the servo patterns. Hence, the longitudinal position of the tape may be identified based on the LPOS information read by the servo reader. The LPOS information may be used for winding the tape media to a given longitudinal position and, for example, starting reading and/or writing at such specified longitudinal position. Other information such as a servo band identifier or manufacturing information may be added too, which, for example, may indicate the manufacturer of the tape cartridge, the date of manufacturing the tape cartridge, information as to the standard the present cartridge may conform to, etc.

In the figures, same or similar elements are denoted by the same reference signs.

FIG. 1 illustrates a schematic top view on a section of a tape 1 according to an embodiment of the present invention. The tape 1 has a longitudinal extension in x direction and a lateral extension in y direction. Servo bands 11 and data bands 12 extend along the longitudinal extension of the tape 1. Each data band 12 is arranged in between two servo bands 11. Each data band 12 contains multiple data tracks wherein preferably multiple of these data tracks of a data band 12 are written and/or read simultaneously in case a head module of the tape drive provides multiple write and/or read elements. Each servo band 11 contains servo patterns arranged in at least two sub-bands along the longitudinal extension of the tape 1 which sub-bands are not shown in detail in FIG. 1.

Figure 2:
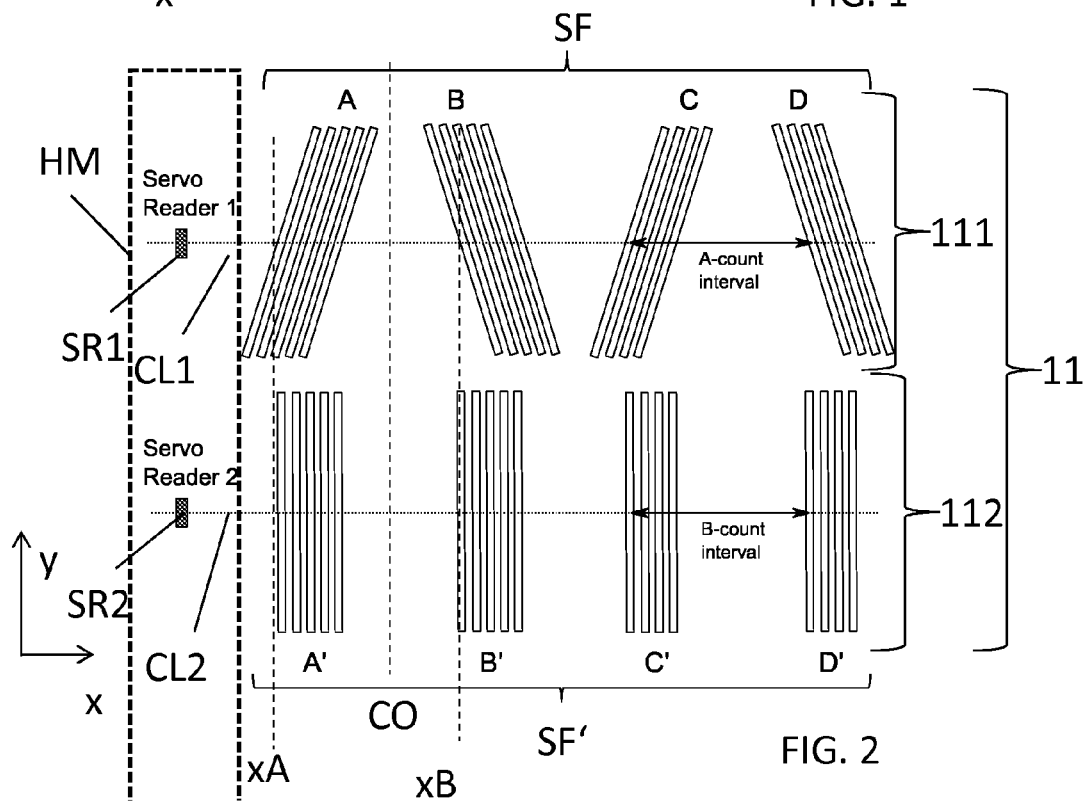
FIG. 2 is a cutout in area Z of the tape storage medium of FIG. 1 in top view according to an embodiment of the present invention.

FIG. 2 illustrates a cutout of area Z of the tape 1 of FIG. 1. Hence, FIG. 2 provides an illustration of sample servo patterns in servo frames SF and SF' in a first sub-band 111 and a second sub-band 112 of a servo band 11, according to an embodiment of the present invention. Generally, a servo frame may represent a longitudinal section of the servo band containing a defined core pattern, which core pattern, for example, is defined by the number of stripes, their orientation and their sequence, and a burst may contain a sub-portion of the core pattern contained in the servo frame. In the present context, a burst preferably contains consecutive stripes of the same orientation. In the present example, the servo frame SF in the first sub-band 111 includes eighteen servo stripes organized in four bursts A, B, C and D of five or four stripes. Each stripe is oriented at an azimuthal angle $\alpha$ or $\beta$ with respect to the lateral extension of the tape 1 in y-direction, in the present example of either $\alpha=+18°$ or $\beta=-\alpha=-18°$. In the present example the servo frame SF' in the second sub-band 112 includes eighteen servo stripes organized in four bursts A', B', C' and D' of five or four stripes. The stripes of the second sub-band 112 are all aligned in parallel to each other. These stripes are all aligned in parallel to the lateral extension y of the tape storage medium, i.e., orthogonal to its longitudinal extension x.

While reading and/or writing data from and/or to the tape, the tape moves relative to a head module HM in the longitudinal direction x. In addition, the head module HM preferably is movable in the lateral direction y, i.e., transverse to the direction x, by means of a suitable actuator. However, due to a lateral offset of the tape with respect to the head module HM, a misalignment of both may occur. For realigning the tape with the head module HM, the position of the head module HM relative to the tape 1 is estimated from a relative timing of pulses (a.k.a. dibits) generated by servo readers SR1 and SR2 of the head module HM reading the servo stripes/patterns from the sub-bands 111 and 112 during tape drive operation. The servo readers SR1 and SR2 are mechanically coupled in the head module HM along with one or more data readers and/or writers for reading and/or writing data from a data band adjacent to the servo band 11.

In particular, in the present example of FIG. 2, a servo channel assigned to the second servo reader SR2 supports estimating a tape velocity by measuring a time difference between the appearance of pairs of stripes in the different bursts of the second sub-band 112 in the form of pulses in the read-back signal of the second servo reader SR2, e.g., between corresponding stripes/pulses of the A'- and the C'-burst and/or between corresponding stripes/pulses of the B'- and D'-burst.

By comparing the relative timing of pulses generated by pairs of stripes with opposite azimuthal angles, e.g., between A- and B-burst stripes and/or C- and D-bursts stripes, combined with the above mentioned velocity estimate, the servo channel can further estimate the lateral position of the head module. In case a deviation is detected between the head module and the tape, a control unit may, in a closed-loop track-following control system, control the actuator of the head module and laterally reposition the head module such that the head module is laterally realigned with the tape. In general, stripes of consecutive bursts within a servo frame, residing at the same position, i.e., an n-th position, are denoted as a pair of stripes, or corresponding stripes.

In the example of FIG. 2, the longitudinal position of the first stripe in the first burst A' is referred to as xA and the longitudinal position of the first stripe in the second burst B' is referred to as xB. The distance xB−xA is known. By building a time difference tB'−tA' at which the stripes occur as pulses in the read-back signal of the second servo reader SR2, the tape velocity v can be determined by v=(xB−xA)/(tB'−tA'). The "B-count interval" in FIG. 2 refers to such approach. Preferably, an average value of the velocity is formed by averaging the velocities for each of the corresponding stripes, e.g., in the A'- and B'-burst.

The second servo reader SR2 presently is arranged on a centerline CL2 of the second sub-band 112 which may represent a desired alignment between the head module HM and the tape 1. So is the first servo reader SR1 on a centerline CL1 of the first sub-band 111. By comparing the relative timing of pulses generated by pairs of stripes with opposite azimuthal angles, e.g., between A- and B-burst stripes and/or C- and D-bursts stripes in the first sub-band 111, corresponding time differences may be determined, such as tB−tA. The time difference tB−tA depends on the lateral position y of the first servo reader SR1 with respect to the first sub-band 111. For example, when the first servo reader SR1 is deviated above the first centerline CL1, the time difference is less in view of the inclination of the corresponding stripes than when the first servo reader SR1 is deviated below the first centerline CL1. The "A-count interval" in FIG. 2 refers to such approach, a constant tape velocity provided. In order to convert the time difference into a distance measure and finally a deviation distance, the tape velocity is required which is determined from the read-back signal of the second servo reader SR2 as is explained above.

Hence, a lateral position y of the head module HM can be estimated, in one embodiment, by summing up all time differences tB−tA of corresponding stripes of the bursts A and B in the first sub-band 111, and by dividing this sum by the sum of all time differences tB'−tA' of corresponding stripes of the bursts A' and B' in the second sub-band 112. In case that a deviation between the head module HM and the tape 1 is determined, a control unit may, in a closed-loop control, control the actuator of the head module and laterally reposition the head module such that the tape head is laterally realigned with the tape.

As shown in the embodiment of FIG. 2, it is preferred, that the stripes in the first and the second sub-band 111, 112 take the same longitudinal position x with reference to the respective sub-band centerlines CL1, CL2, i.e., the first stripe in burst A has a position xA on the centerline CL1, which corresponds to the position of the first stripe in burst A' on the centerline CL2. This effects that the tape velocity measured by means of the servo frame SF' in the second sub-band 112 is measured at the same time the lateral deviation measure is taken from the servo frame SF in the first sub-band 111.

In the example of FIG. 2, the first burst A in the first sub-band 111 and the first burst A' in the second sub-band 112 are mirrored into the second burst B of the first sub-band 111 and the second burst B' of the second sub-band 112 at a common centerline CO orthogonal to the longitudinal extension x of the tape storage medium 1 between the first and second bursts A, A', B, B' of the first and second sub-band 111, 112.

In the above embodiments, a timing-based servo (TBS) approach is used with respect to the servo patterns in the first and second sub-bands 111, 112. The TBS approach makes use of scanning servo bursts sequentially arranged along the two sub-bands of a servo band. The two sub-bands are arranged next to each other and each is scanned by a dedicated servo reader of a common head module. Each servo burst in the first sub-band preferably includes a pattern that extends throughout a width of the sub-band and in addition shows an asymmetry both with respect to a longitudinal centerline of the first sub-band and with respect to a lateral axis, such that for each position of the servo reader being laterally offset from its reference position pulses in the position error signal show up at different times with respect to a pulse that would originate from a servo reader being positioned in its reference position. Preferably, the lateral position measure derived from the read-back signal of the first servo reader is interpreted by information contained in pulses in the read-back signal of the second servo reader.

In an embodiment, the servo band may include a third sub-band, e.g., on top of the first sub-band 111 in FIG. 2. In the third sub-band, the servo pattern of the second sub-band may be repeated, such that at least a first and a second burst of the third sub-band include stripes parallel to each other. This may enhance availability of servo information.

Figure 3:
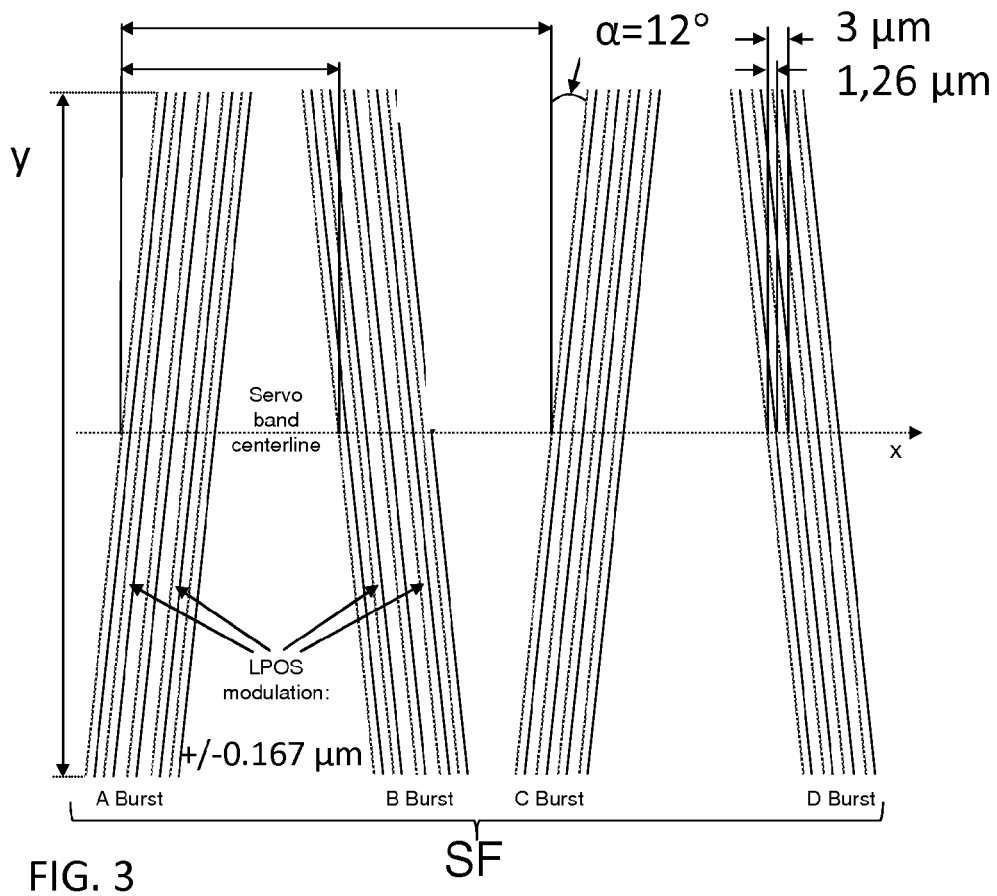
FIG. 3 is a top view on a geometry of a servo pattern as used in the first sub-band of a tape storage medium according to an embodiment of the present invention.

FIG. 3 illustrates a modification of the servo frame SF written to the first sub-band 111 of FIG. 2. Now, additional information is encoded in the servo frame SF.

Again, the A- and B-bursts include five stripes each, whereas the C- and D-bursts include four stripes each. The stripes of the A-burst and the C-burst are arranged in parallel, and the stripes of the B-burst and the D-burst are arranged in parallel. The stripes of the A-burst and the C-burst are inclined by an angle α of +12° degrees with respect to the lateral axis y, and the stripes of the B-burst and the D-burst are inclined by an angle α of −12° degrees with respect to the lateral axis y. A stripe width of 1.26 μm may be used, for example, and the distance between stripes of the same servo burst may, for example, be 3 μm.

In the present example, a pulse position modulation (PPM) is used for encoding the additional information. The stripes the modulation is applied to are the second and fourth stripes of each of the A- and B-burst. A modulation that represents one of the M symbols of an alphabet may, for example, show an offset of the subject stripe—which offset is also denoted as modulation depth—of, e.g., 0.167 μm. In the present example, the symbol is encoded by modulating the pulse position of the second stripe in the A-burst by −0.167 μm and simultaneously modulating the pulse position of the fourth stripe in the A-burst by +0.167 μm. The same encoding is repeated in the B-burst. An LPOS word in the present example may, for example, contain 36 symbols represented by 36 servo frames, and may provide information on a specific absolute longitudinal address. Therefore, an LPOS word may appear every 5.47 mm down the tape media, i.e., once every 36 servo frames, each of which is 152 µm long and encodes 1 symbol of information.

Figure 4:
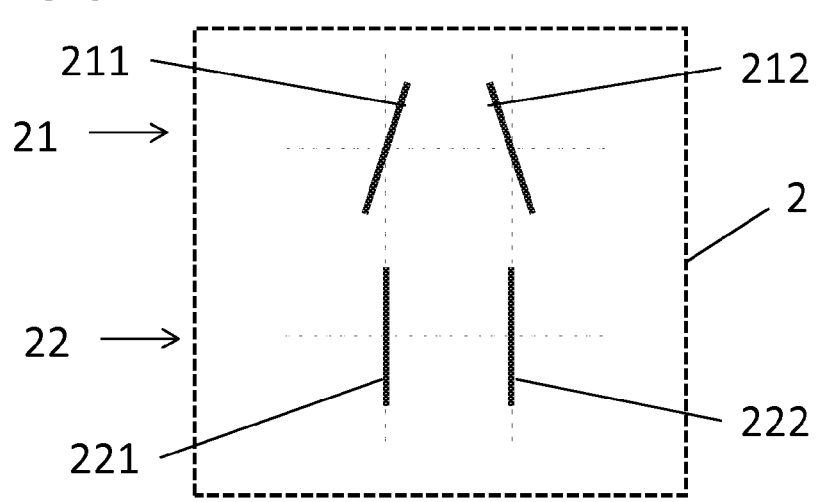
FIG. 4 is a schematic top view on a geometry of a write head module for writing a servo pattern according to an embodiment of the present invention.

FIG. 4 illustrates an embodiment of a write head module 2 for writing a servo pattern to a servo band as shown in FIG. 2, e.g., at a tape manufacturer. The write head module 2 includes two sections 21 and 22 next to each other, each with two write gaps. In the first section 21, two write gaps 211 and 212 are provided and inclined with respect to each other for simultaneously writing a pair of stripes in the first sub-band 111, e.g., according to FIG. 2. In the second section 22, two write gaps 221 and 222 are arranged in parallel for simultaneously writing a pair of stripes in the second sub-band 112, e.g., corresponding stripes of burst A' and burst B' of the second sub-band 112, e.g., according to FIG. 2.

It is assumed, that in this embodiment the write head module 2 includes only a single coil for generating a magnetic flux across all four write gaps 211, 212, 221, 222 when applying an electric current to this single coil. Hence, four stripes are written at the same time, two inclined ones to the first sub-band 111, and another two parallel ones to the second sub-band 112.

In order to write the first two bursts A, B and A', B' of each sub-band 111, 112 according to FIG. 2, in a first position of the write head module 2 with respect to the tape storage medium a current pulse may be applied to the single coil of the write head module 2 such that the first stripes of each of the bursts A, B and A', B' are written. Then the tape is moved further and another current pulse is applied to the single coil of the write head module 2 for writing the four second stripes of each of the bursts A, B and A', B', and so on.

Figure 5A:
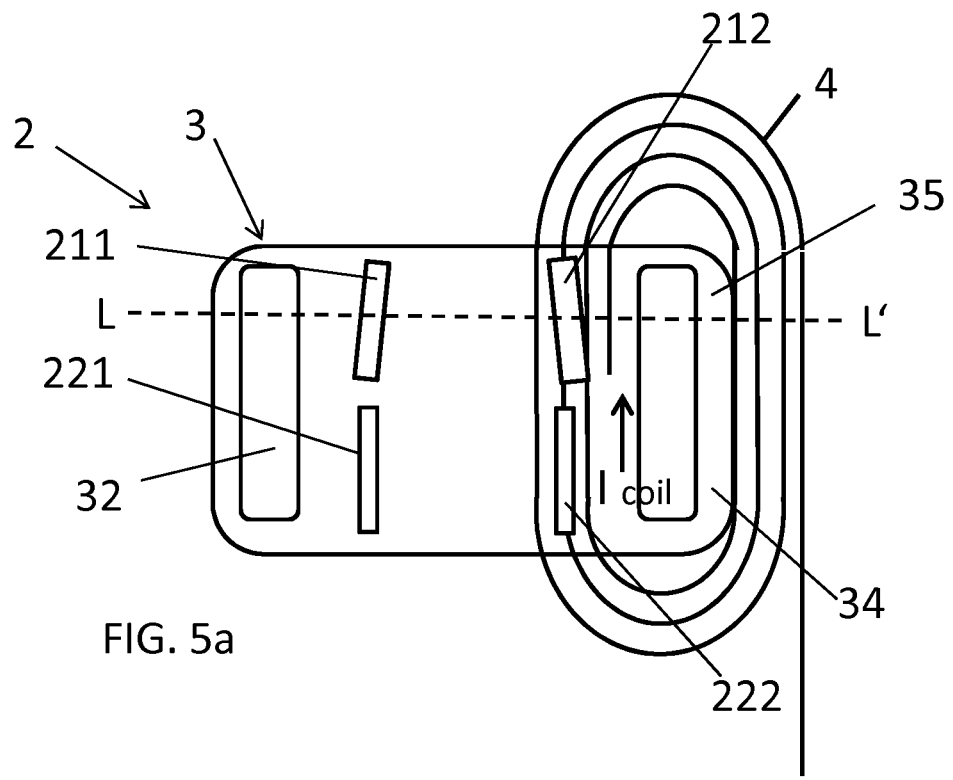
FIG. 5a is a top view and 5b is a side cut of a write head module for writing a servo pattern according to another embodiment of the present invention.

FIG. 5 illustrates the write head module 2 of FIG. 4 in a different view. Diagram 5a) illustrates a top view, and diagram 5b) a side cut along the line L-L'. A single coil 4 is wound around a section 34 of a pole piece structure 3. Other than that a ring structure RS1 contains a yoke 32, bottom pole 36, yoke 34 and top pole 35. The top pole 35 contains the four write gaps 211, 212, 221, 222 in form of openings for writing the stripes to the tape. Accordingly, the ring structure RS1 at the same time denotes the magnetic flux induced when a current $I_{coil}$ is applied to the coil 4.

Figure 5B:
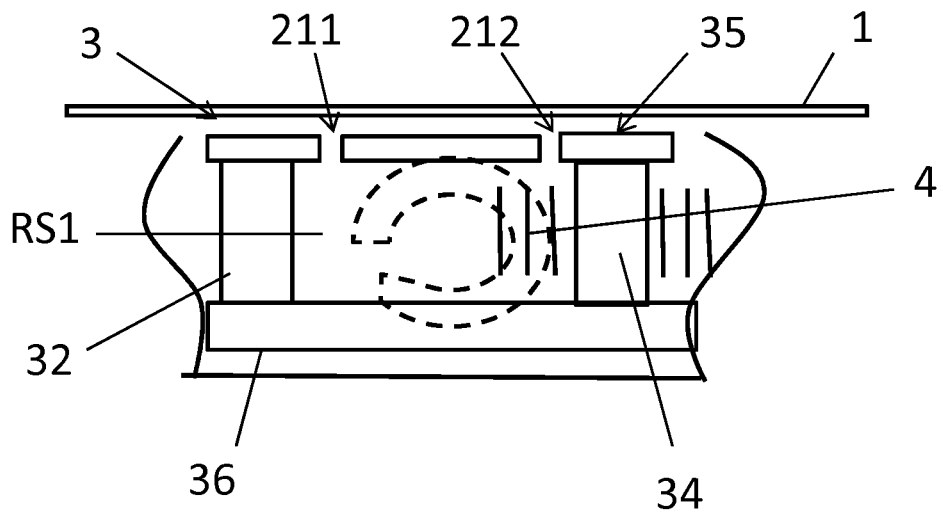

Given that there only is a single coil 4 provided in the embodiment of FIG. 5, all four stripes are written by applying one current pulse $I_{coil}$ to the coil 4. The magnetic flux RS1, induced by applying this current pulse $I_{coil}$ generates a magnetization of the part of the tape 1 that presently covers the write gaps 211, 212, 221, 222 as is indicated in FIG. 5b).

Figure 6:
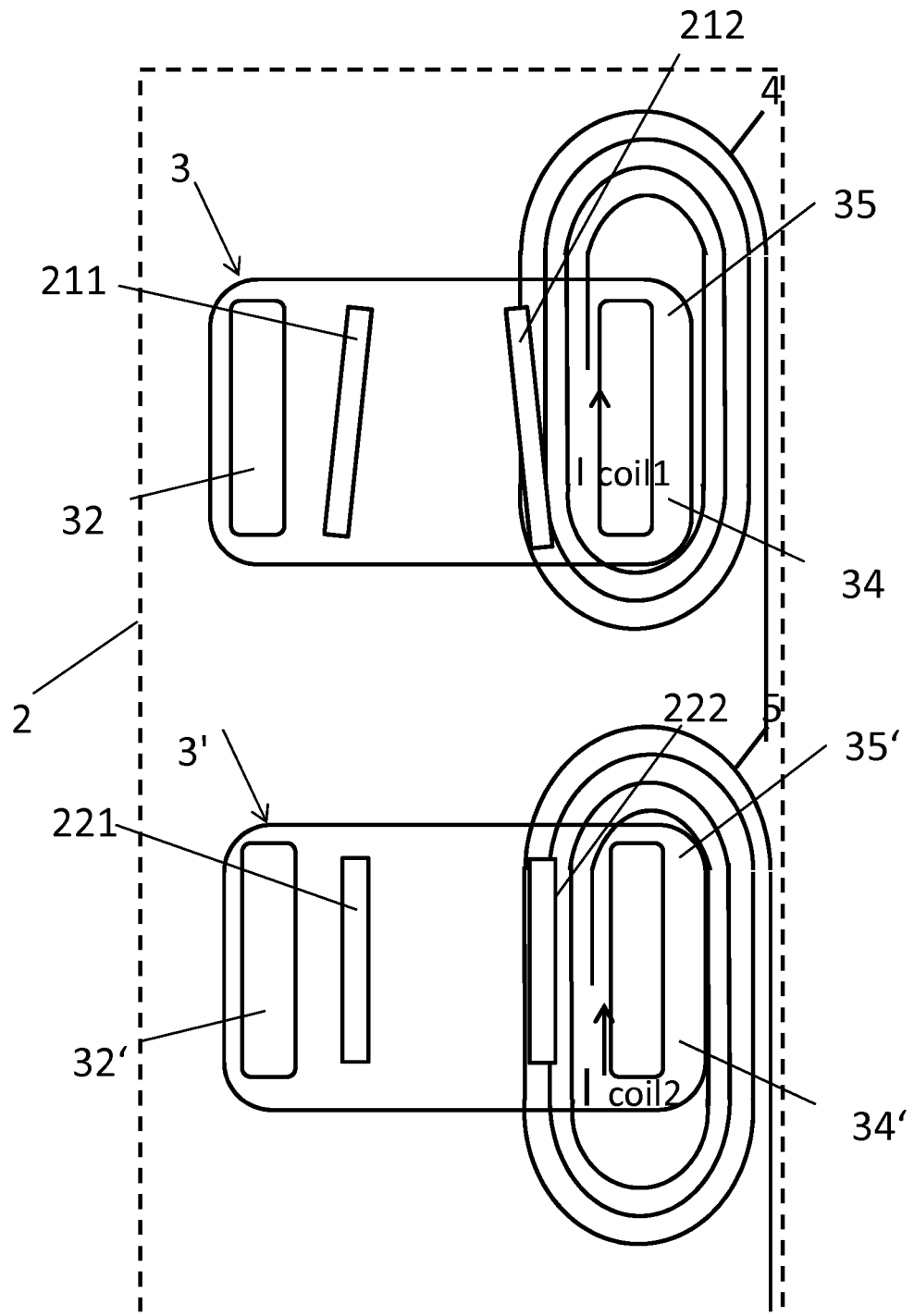
FIG. 6 is a top view of a write head module for writing a servo pattern according to a further embodiment of the present invention.

FIG. 6 illustrates a view on top of a write head module 2 for writing a servo pattern to a magnetic tape storage medium according to another exemplary embodiment. In contrast to the write head module 2 of FIG. 5, the present write head module 2 contains two coils 4 and 5, wherein each coil 4, 5 generates a magnetic flux when an electric current $I_{coil1}$, $I_{coil2}$ is applied to the subject coil 4, 5. Hence two magnetic fluxes can be generated independent from each other. Accordingly, there are two pole piece structures 3, 3' according to the description of the pole piece structure 3 of the embodiment of FIG. 5. The first pole piece structure 3 now solely embodies the inclined write gaps 211 and 212 but not the parallel write gaps 221, 222. The parallel write gaps 221, 222 are now embodied in the second pole piece structure 3'.

As a result, the inclined stripes of the first sub-band 111 can be written independent from the parallel stripes of the second sub-band 112. This may be beneficial in that the number of stripes in a burst of the first sub-band 111 not necessarily is to be equal to the number of stripes in the corresponding burst of the second sub-band 112. While this type of write head module also allows for an offset of stripes of corresponding bursts in the first and the second sub-band 111, 112, this write head module also allows writing a pattern such as shown in FIG. 2, i.e., applying the current pulses $I_{coil1}$ and $I_{coil2}$ simultaneously. However, additional current pulses may be applied to one of the coils 4 or 5 such that additional stripes may be written in between the stripes of the servo pattern shown in FIG. 2.

This independent writing to each of the sub-bands may in particular be applied for encoding additional information such as LPOS information in only one of the sub-bands if desired. Alternatively, different additional information may be encoded in the at least two sub-bands which allows for an increase of additional information that can be encoded compared to conventional tape storage media.

Instead, if additional information is written by a write head module 2 according to FIG. 5 to the servo band 11, the additional information is encoded in a redundant way in the servo frames of both, the first sub-band 111 and the second sub-band 112. This variant, however, may have the advantage that the same additional information is available from both of the sub-bands, which enhances reliability.

It will be understood by those skilled in the art that many modifications and permutations may be made without departing from the scope of the present invention. For example, generalizations with different number of stripes per burst and/or additional encoded bits are easily possible.

As will be appreciated by one skilled in the art, aspects of the present invention may be embodied as a tape storage medium, a write head module, a head module, methods or a computer program product. Furthermore, aspects of the present invention, such as the write method or the read method may take the form of a computer program product embodied in one or more computer readable medium(s) having computer readable program code embodied thereon. Accordingly, aspects of the present invention which may execute the one or more methods may take the form of an entirely hardware embodiment, an entirely software embodiment (including firmware, resident software, micro-code, etc.) or an embodiment combining software and hardware aspects that may all generally be referred to herein as a "circuit," "module" or "system."

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The invention claimed is:

1. A magnetic tape storage medium, comprising:
    at least one servo band with at least two sub-bands along a longitudinal extension of the tape storage medium;
    servo bursts written to the at least two sub-bands for supporting to determine positional information of the tape storage medium;
    wherein, in a first of the at least two sub-bands, a first burst comprises at least one servo stripe inclined at a first non-zero angle with respect to a direction orthogonal to the longitudinal extension of the tape storage medium, followed by a second burst comprising at least one servo stripe inclined at a second non-zero angle with respect to the direction orthogonal to the longitudinal extension of the tape storage medium, which second angle is different from the first angle;
    wherein, in a second of the at least two sub-bands, a first burst comprises at least one servo stripe followed by a second burst comprising at least one servo stripe, which stripes of the first and the second burst are parallel to each other
    wherein a third of the at least two sub-bands comprises a first burst comprising at least one servo stripe followed by a second burst comprising at least one servo stripe which stripes of the first and the second burst of the third sub-band are parallel to each other and the first sub-band is arranged between the third sub-band and the second sub-band.

2. The magnetic tape storage medium of claim 1, wherein the stripes of the first and the second burst of the second sub-band are aligned orthogonal to the longitudinal extension of the tape storage medium.

3. The magnetic tape storage medium of claim 1, wherein the stripes of the first and the second burst of the second sub-band are aligned non-orthogonal to the longitudinal extension of the tape storage medium.

4. The magnetic tape storage medium of claim 1, wherein the number of stripes in the first burst of the first sub-band is equal to the number of stripes in the second burst of the first sub-band, and wherein the number of stripes in the first burst of the second sub-band is equal to the number of stripes in the second burst of the second sub-band.

5. The magnetic tape storage medium of claim 1, wherein the number of stripes in the first burst of the first sub-band is equal to the number of stripes in the first burst of the second sub-band, and wherein the number of stripes in the second burst of the first sub-band is equal to the number of stripes in the second burst of the second sub-band.

6. The magnetic tape storage medium of claim 1, wherein the number of stripes in the first burst of the first sub-band is different from the number of stripes in the first burst of the second sub-band, and wherein the number of stripes in the second burst of the first sub-band is different from the number of stripes in the second burst of the second sub-band.

7. The magnetic tape storage medium of claim 1, wherein:
    the first stripe of the first burst in the first sub-band crosses a centerline of the first sub-band at the same longitudinal position of the tape storage medium as the first stripe of the first burst in the second sub-band crosses a centerline of the second sub-band;
    the first stripe of the second burst in the first sub-band crosses the centerline of the first sub-band at the same longitudinal position as the first stripe of the second burst in the second sub-band crosses the centerline of the second sub-band;
    each stripe of the first burst in the first sub-band crosses the centerline of the first sub-band at the same longitudinal position as the corresponding stripe of the first burst in the second sub-band crosses the centerline of the second sub-band; and
    each stripe of the second burst in the first sub-band crosses the centerline of the first sub-band at the same longitudinal position as the corresponding stripe of the second burst in the second sub-band crosses the centerline of the second sub-band.

8. The magnetic tape storage medium of claim 1, wherein the first burst in the first sub-band and the first burst in the second sub-band are mirrored into the second burst of the first sub-band and the second burst of the second sub-band at a common centerline orthogonal to the longitudinal extension of the tape storage medium between the first and second bursts of the first and second sub-band.

9. The magnetic tape storage medium of claim 1, wherein:
a servo frame of the first sub-band comprises the first burst and the second burst and a third burst following the second burst and a fourth burst following the third burst;
a servo frame of the second sub-band comprises the first burst and the second burst and a third burst following the second burst and a fourth burst following the third burst;
the third burst of the first sub-band comprises at least one servo stripe inclined at a first non-zero angle with respect to a direction orthogonal to the longitudinal extension of the tape storage medium followed by at least one servo stripe of the fourth burst of the first sub-band inclined at a second non-zero angle with respect to the direction orthogonal to the longitudinal extension of the tape storage medium, which second angle is different from the first angle;
the third burst of the second sub-band comprises at least one servo stripe followed by at least one servo stripe of the fourth burst of the second sub-band, which stripes of the third and the fourth burst of the second sub-band are parallel to each other;
the number of stripes in the third burst of each of the first and second sub-band is different to the number of stripes in the first burst of each of the first and second sub-band; and
the number of stripes in the fourth burst of each of the first and second sub-band is different to the number of stripes in the second burst of each of the first and second sub-band.

10. The magnetic tape storage medium of claim 1, further comprising additional information encoded in the servo bursts of one or more of the first and second sub-band, wherein the additional information includes one or more of a servo band identifier and a longitudinal position of the tape storage medium.

11. A write head module for writing a servo pattern to the magnetic tape storage medium of claim 1, and for writing the first and the second servo burst of the first and second sub-band of the magnetic tape storage medium, the write head module comprising:
at least one coil configured to generate a magnetic flux when applying an electric current to the coil; and
a pole piece structure configured to guide the generated magnetic flux, wherein the pole piece structure comprises:
a first section configured to write a servo pattern to the first sub-band of a servo band of the tape storage medium, the first section comprising a first gap in the form of a stripe inclined at a first non-zero angle with respect to a direction orthogonal to a longitudinal extension of the tape storage medium when being written, and a second gap in the form of a stripe inclined at a second non-zero angle with respect to a direction orthogonal to a longitudinal extension of the tape storage medium when being written, which second angle is different from the first angle; and
a second section next to the first section for writing a servo pattern to a second sub-band of the servo band of the tape storage medium, the second section comprising a first gap in the form of a stripe, and a second gap in the form of a stripe, which first and second gap are parallel to each other.

12. The write head module of claim 11, further comprising a single coil configured to generate the magnetic flux across the first and the second gap of the first section and the first and the second gap of the second section when applying an electric current to the single coil.

13. The write head module of claim 11, further comprising:
a first coil configured to generate the magnetic flux across the first and the second gap of the first section when applying an electric current thereto;
a second coil configured to generate the magnetic flux across the first and the second gap of the second section when applying an electric current thereto, wherein the electric current to the first coil and the electric current to the second coil are independently applicable.

14. A method for writing a servo pattern to a magnetic tape storage medium with the write head module of claim 12, the method comprising:
moving the magnetic tape storage medium and servo band across the first and second gaps of the write head module in a direction along the longitudinal extension of the magnetic tape storage medium;
applying a current pulse to the coil;
continuing to move the magnetic tape storage medium; and
applying another current pulse to the coil.

15. A method for writing a servo pattern to a magnetic tape storage medium with a write head module of claim 13, the method comprising:
moving the magnetic tape storage medium and servo band across the first and second gaps of the write head module in a direction along the longitudinal extension of the magnetic tape storage medium;
applying a current pulse to the first coil;
continuing to move the magnetic tape storage medium; and
applying a current pulse to the second coil.

16. The method of claim 15, wherein a current pulse is additionally applied to the second coil simultaneous to applying the current pulse to the first coil.

17. A head module configured for reading from a servo band of the magnetic tape storage medium of claim 1, comprising:
a first servo reader arranged for reading from the first sub-band; and
a second servo reader arranged for reading from the second sub-band;
wherein the first and the second servo reader are arranged in the head module next to each other.

18. A method for reading from the magnetic tape storage medium of claim 1, the method comprising:
reading the first and the second burst of the first sub-band by a first servo reader;
determining a first time interval between appearances of two corresponding stripes of the first and second burst in the read-back signal of the first servo reader;
reading the first and the second servo burst of the second sub-band by a second servo reader;
determining a second time interval between appearances of two corresponding stripes of the first and second burst in the read-back signal of the second servo reader, and
determining a lateral position of a head module containing the first and the second servo reader with respect to the tape storage medium dependent on the first and the second time interval.

19. The method of claim 18, wherein:
an average first time interval is determined for the appearance of any two corresponding stripes of the first and second burst in the read-back signal of the first servo reader;

an average second time interval is determined for the appearance of any two corresponding stripes of the first and second burst in the read-back signal of the second servo reader; and the lateral position of the head module is determined dependent on a ratio of the average first time interval and the average second time interval.

* * * * *